March 18, 1969        G. A. LASKO        3,433,521

TELESCOPIC POLES WITH LOCKING MEANS FOR PICKING UP LINE

Filed Aug. 17, 1967

GEORGE A. LASKO
INVENTOR

BY   *Tom Sherrard, atty.*

United States Patent Office 3,433,521
Patented Mar. 18, 1969

3,433,521
TELESCOPIC POLES WITH LOCKING MEANS
FOR PICKING UP LINE
George A. Lasko, 1367 Vulcan St.,
El Cajon, Calif. 92021
Filed Aug. 17, 1967, Ser. No. 661,412
U.S. Cl. 294—19                                4 Claims
Int. Cl. A47f 13/06

ABSTRACT OF THE DISCLOSURE

This invention provides a line grasping device such as a boathook for picking up and holding a line without direct manual contact with the line. The device includes a pole and a means for securing a hook assembly to the said pole. The hook assembly includes a pair of substantially rigid, spirally looped hooks having base ends connected to a common shaft. The hooks extend from the common shaft in divergent directions with respect to each other and are therefore substantially spaced apart to provide free movement of the line therebetween. The hooks have an arcuate configuration and free ends that are disposed in opposite directions with respect to each other. An enlarged portion is located on each of the said free ends. The pole means may be adjustable in length.

BACKGROUND OF INVENTION

Heretofore there has been a long-felt need for an efficient device for picking up and holding a line without direct manual contact with the line. Examples of situations requiring such a device include, but are not limited to, grasping lines on sailboats where manual placement of the conventional whisker-pole or boathook is often awkward; placement of clotheslines in a supported position and movement of dangerous high voltage lines. It is very desirable to have a pole which is variable in length. The distance from a line to any operator varies. A pole spanning such distance must therefore be variable in length. After establishing the pole length it cannot change in length nor can sections rotate in respect to each other.

Prior art had not provided a simple, fool-proof securing means for telescopic poles, taken in combination with an improved looped line hook. As will appear herein, I have provided a quick and simple means for making a pole rigid at any desired length.

Also, heretofore, there had not been a practical means for both picking up a line and retaining it after it had been picked up. Separate devices usually have been required. For example a simple open hook on the end of a pole may be practical for snaring a line. However, the simple hook will not retain the line for it is likely to escape through the space which made its snaring practical. By contrast, oppositely disposed, cork-screw shaped loops have retained lines, but the entry of the line into the loop has been difficult. Existing art does not couple easy entry of the line into the loops, with escape proof engagement thereafter. For example the disclosure in the Benson Patent No. 2,468,160 shows loops with slightly overlapping bills. This may be sufficient retention means for the stated purpose of use as a clothesline pole. However, nonstatic use is not indicated. It is apparent that movement of the line or pole, or both, would permit disengagement.

On the other hand more circumscribing loops, as in Fisher Patent No. 85,169 may retain a line but its extended bills are self-defeating because they also serve as a partial bar to initial entry of the line.

In contrast to conventional devices, my assembly has means for expediently fixing a pole at preferred length and means for engaging a line, holding it, even during movements, and releasing it with ease.

SUMMARY

My invention comprises a plurality of telescopic poles; a friction element provided thereon for retaining the poles in a fixed position in respect to one another; dual looped hooks at the end of one pole and an enlarged portion at the end of each hook.

BRIEF DESCRIPTION OF DRAWING

In the drawings showing preferred embodiments of my invention wherein like numerals represent like parts throughout.

DESCRIPTION OF PREFERRED EMBODIMENTS

Figures 1, 2, 3:
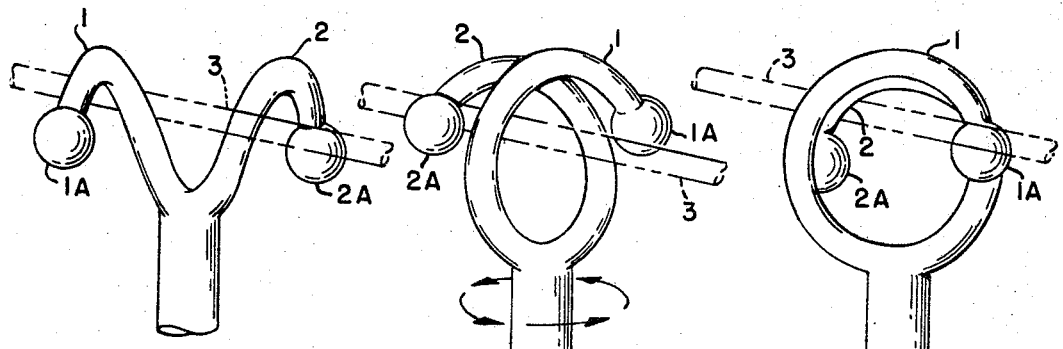
FIGURE 1 is a side elevation of the hooking portion of my device.
FIGURE 2 is the same portion viewed from 45 degrees of that in FIGURE 1.
FIGURE 3 is the same viewed from 90 degrees of that in FIGURE 1.
Figure 4:
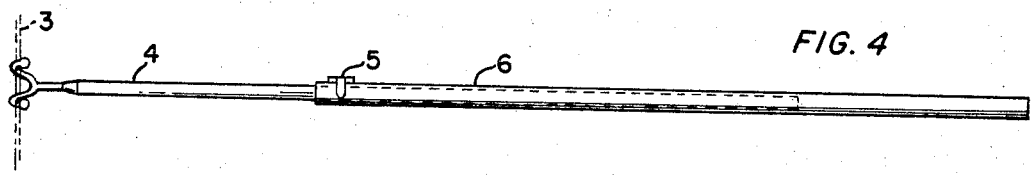
FIGURE 4 is a side view of my entire device.

Referring to the drawings forming a part hereof, the numerals 1 and 2 indicate two identical looped rods of a hooking assembly. Their base ends form a common shaft. It is secured to pole section 4. Novel enlarged portions 1A and 2A are positioned on the opposite ends, or bills, of the rods. The rods are formed by bending rods in arcuate configuration, oppositely disposed, with gradual and uniform spreading apart.

The novel enlarged portions are preferably spherical in shape. They are integral with the cylindrical rods. The relative sizes of the rods and enlarged portions is such that line 3 easily enters the space within the loops but, once there, its escape is effectively restrained by the ends of the bills of the rods. Because of the enlarged portions, I find that the looped rods may describe slightly more than a semi-circle when viewed from the side, as in FIGURE 3. Also, the line is restrained from accidental disengagement even when the enlarged ends are arched at less than a circular path. Such configuration makes more accessible the line to be picked-up.

Figure 5:
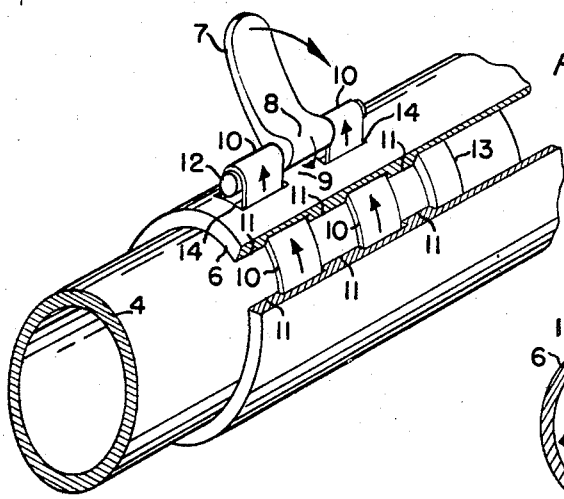
FIGURE 5 is a perspective view of my preferred locking means with a portion cut-a-way.

To secure the plurality of slidable telescopic pole sections 4 and 6, I prefer to use the novel locking assembly shown in FIGURE 5. It is comprised of one or more braking bands 10 which are operatively secured to the outer pole section. They surround the inner pole section. Items 10 are preferably two in number and are made of non-stretchable flexible material. A fiberglass works fine. As can be seen in the drawing a lever 7 with cam 8 is operatively mounted between items 10. Pin 12 is provided through the cam and bands whereby the bands move in the direction of the arrows thereon when the lever 7 is moved toward the pole at point 9. The frictional drag of the bands on the pole thusly hold the inner pole in unison with the outer pole. When lever 7 is in the position shown in FIGURE 5 the poles may be easily moved independent of each other. Grooves are cut into the inside circumference of pole 6. They are of proper size and number to have bands 10 loosely mounted therein. Resultant flanges 11 have shoulders that abut the edges of bands 10. An additional ring 13 is preferably mounted to inner pole 4. Its engagement with element 11 prevents complete separation of the poles. Suitable orifices 14 in pole 6 permit outside exposure of the bands. This completes the outside locking means 5 for the poles.

Figure 6:
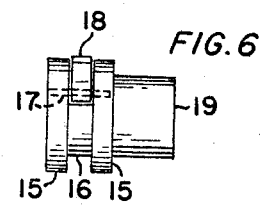
FIGURE 6 is a side view of a modification thereof.

As an alternative, I have provided an inside locking means which depends upon frictional drag on the inside circumference of the outer concentric pole for its operation. In this instance the locking assembly comprises a cylindrical plug 19 which snugly fits into the end of inner pole 4 and which may be held by rivets 25. Integral therewith are dual disks 15 in parallel space relationship with each other. A spacer 16 is formed between the two disks. Detent 18 is operatively mounted on pin 17 between the disks. Lastly an open ring shaped member 24 is freely mounted between disks 15 whereby their sides may then loosely abut. The incomplete ring portion of member 24 is of proper size to accept the angled head portion of detent 18. The outside surface of member 24 contacts the inside surface of pole or tube 6 even when not in the locking position. See FIGURE 8. To lock, outside pole is turned in the direction of arrow 20 of FIGURE 7. Inner pole 4 is concurrently turned oppositely in the direction of arrow 21. Pole 4 of course carries with it all of the elements depicted in FIGURE 6. The "drag" of member 24 tends to carry it with pole section 6. The member is then expanded by the wedging action of detent 18 into its open section.

Figures 7, 8:
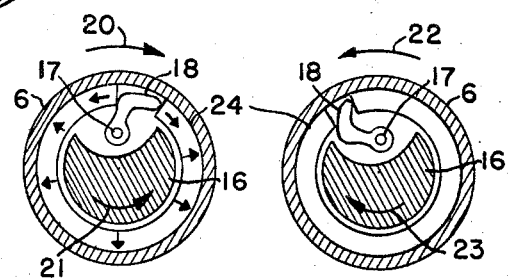
FIGURE 7 is a cross sectional view of the modified locking means showing it engaged.
FIGURE 8 is a cross sectional view thereof showing it not engaged.
Figure 9:
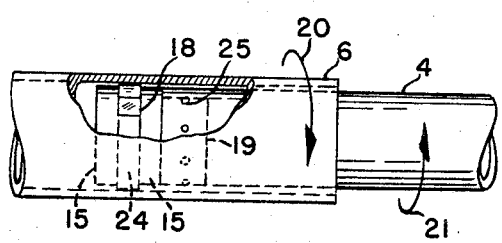
FIGURE 9 is a side view of a portion of my device showing operation of the modification.

To release the unison position of the sections, the inner pole section is turned in the direction of arrow 23 of FIGURE 8 and the outer pole section is turned in direction of arrow 22. The detent is then forced out of the open space of member 24. The detent is substantially foot shaped. Force on the "toe" causes the detent to back out of the space, while force on the "sole" causes it to occupy the open space of member 24. Because the "leg" of detent 18 is pivoted on pin 17, continued revolving of the poles will cause them to lock together as the "heel" of the detent is engaged with the member as in FIGURE 7. Reversing the operation releases the poles.

It is assumed that one skilled in the art may make modifications of the described embodiments which will remain within the scope of my invention as claimed.

I claim:

1. A line grasping device such as a boathook for picking up and holding a line without direct manual contact with the line comprising, in combination,
   (a) a hook assembly including a pair of substantially rigid, spirally looped hooks having base ends connected to a common shaft,
   (b) said hooks extending from said common shaft in divergent directions with respect to each other,
   (c) said hooks being substantially spaced apart to provide free movement of the line therebetween,
   (d) said hooks having an arcuate configuration and having free ends disposed in opposite directions with respect to each other,
   (e) an enlarged portion located on each said free end, and
   (f) means securing said hook assembly to a pole means.

2. A line grasping device as defined in claim 1 wherein said pole means includes at least two telescoping sections and a locking assembly having frictional means to lock said telescoping sections in place with respect to one another.

3. A line grasping device as defined in claim 2 wherein said telescoping sections include an outer pole section and an inner pole section,
said locking assembly including means securing at least one braking band to said outer pole section,
said braking band surrounds said inner pole section, and
means attaching a lever means to said braking band to loosen and tighten said braking band around said inner pole section.

4. A line grasping device as defined in claim 2 wherein said telescoping sections include an outer pole section and an inner pole section,
said locking assembly including means securing said assembly to said inner pole section,
dual disks mounted in a spaced relationship to each other,
a spacer member located between said dual disks,
a ring member having an opening and being freely mounted between said dual disks and having an outside surface in contact with said outer pole section, and
means mounting a detent between said dual disks to move into and out of said ring opening to cause said ring to loosen and tighten its contact with said outer pole section.

References Cited

UNITED STATES PATENTS

| 160,315 | 3/1875 | Fuller | 248—353 |
| 172,891 | 2/1876 | Poole | 294—23.5 |
| 1,045,680 | 11/1912 | Cronin | 294—19 |
| 2,549,257 | 4/1951 | Staunt | 294—19 |
| 3,306,649 | 2/1967 | Zagwyn. | |

ANDRES H. NIELSEN, *Primary Examiner.*